United States Patent
Ehrenberg

[15] 3,695,170
[45] Oct. 3, 1972

[54] APPARATUS FOR COOKING FOODS

[72] Inventor: Gustave Ehrenberg, c/o 133 Golf Hills Rd., Havertown, Pa. 19083

[22] Filed: Jan. 12, 1970

[21] Appl. No.: 2,053

[52] U.S. Cl..................................99/386, 198/229
[51] Int. Cl................................................A47j 37/04
[58] Field of Search........99/386, 443, 349, 427, 345, 99/373, 391; 107/55; 198/229; 219/339, 388, 391–395

[56] References Cited

UNITED STATES PATENTS

| | | | |
|---|---|---|---|
| 3,528,361 | 9/1970 | LeVan | 99/349 |
| 1,955,026 | 4/1934 | Savage | 99/341 |
| 2,151,401 | 3/1939 | Belcher | 99/386 UX |
| 2,454,370 | 11/1948 | Beaubien | 107/55 R X |
| 2,917,990 | 12/1959 | Ehrenberg | 99/386 |
| 3,229,616 | 1/1966 | Reese | 99/386 |
| 3,256,803 | 6/1966 | Nelson | 99/349 |
| 3,372,635 | 3/1968 | Meyer | 99/386 X |

*Primary Examiner*—Robert W. Jenkins
*Assistant Examiner*—Arthur O. Henderson
*Attorney*—Busser, Smith and Harding

[57] ABSTRACT

Food articles, for example steaks, are transported by a continuous, twistable conveyor chain through a path between a pair of electrical heating elements. The conveyor is guided so that the supporting surface provided by the conveyor is held in inclined relationship with respect to the vertical while passing between the heating elements. The heating elements are arranged to produce uniform heating of the food, but are disposed so that a space is provided between the heating elements, underneath the lowermost edge of the conveyor for drippage.

16 Claims, 8 Drawing Figures

PATENTED OCT 3 1972

INVENTOR
GUSTAVE EHRENBERG

BY
*Busser, Smith & Harding*

ATTORNEYS

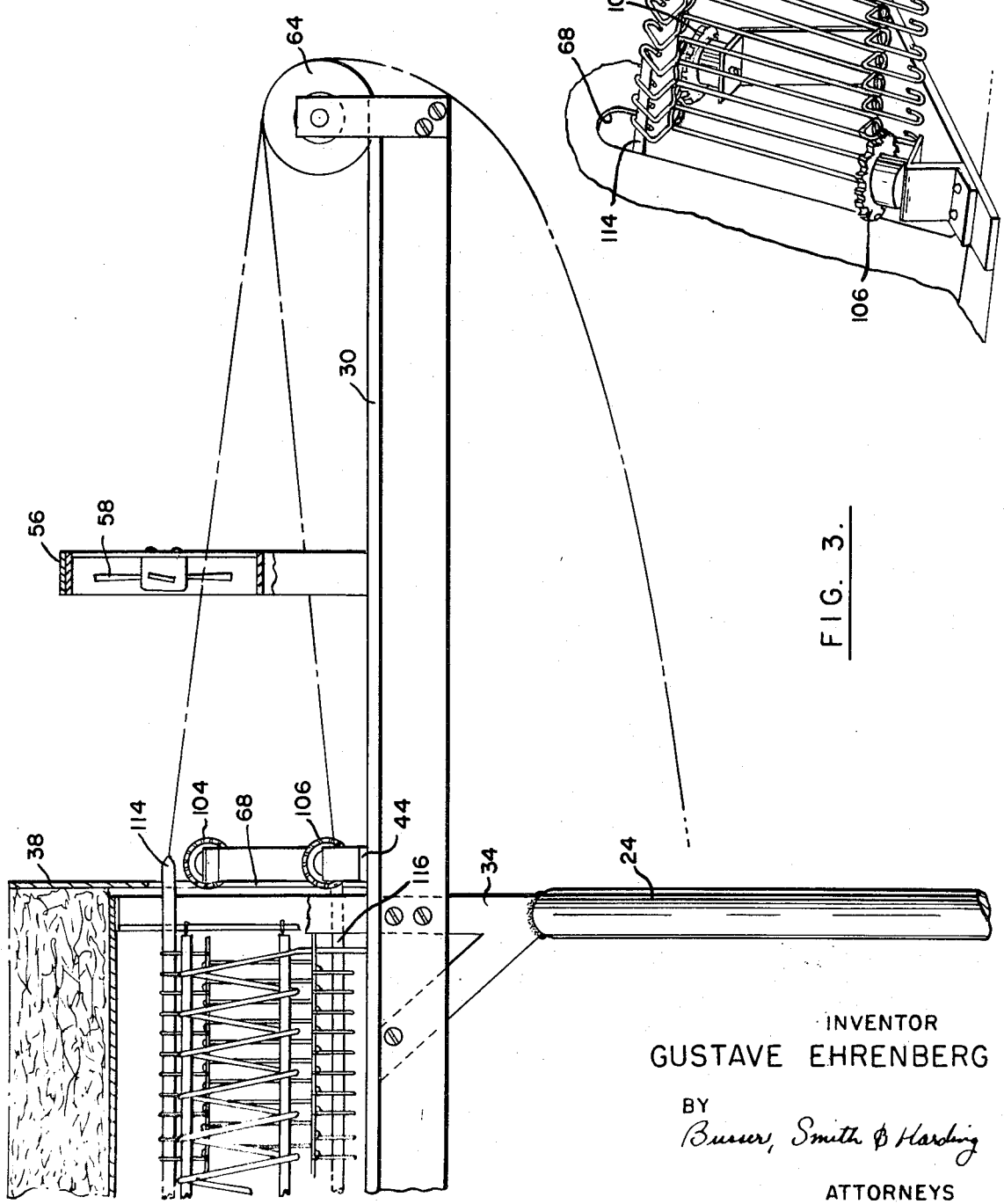

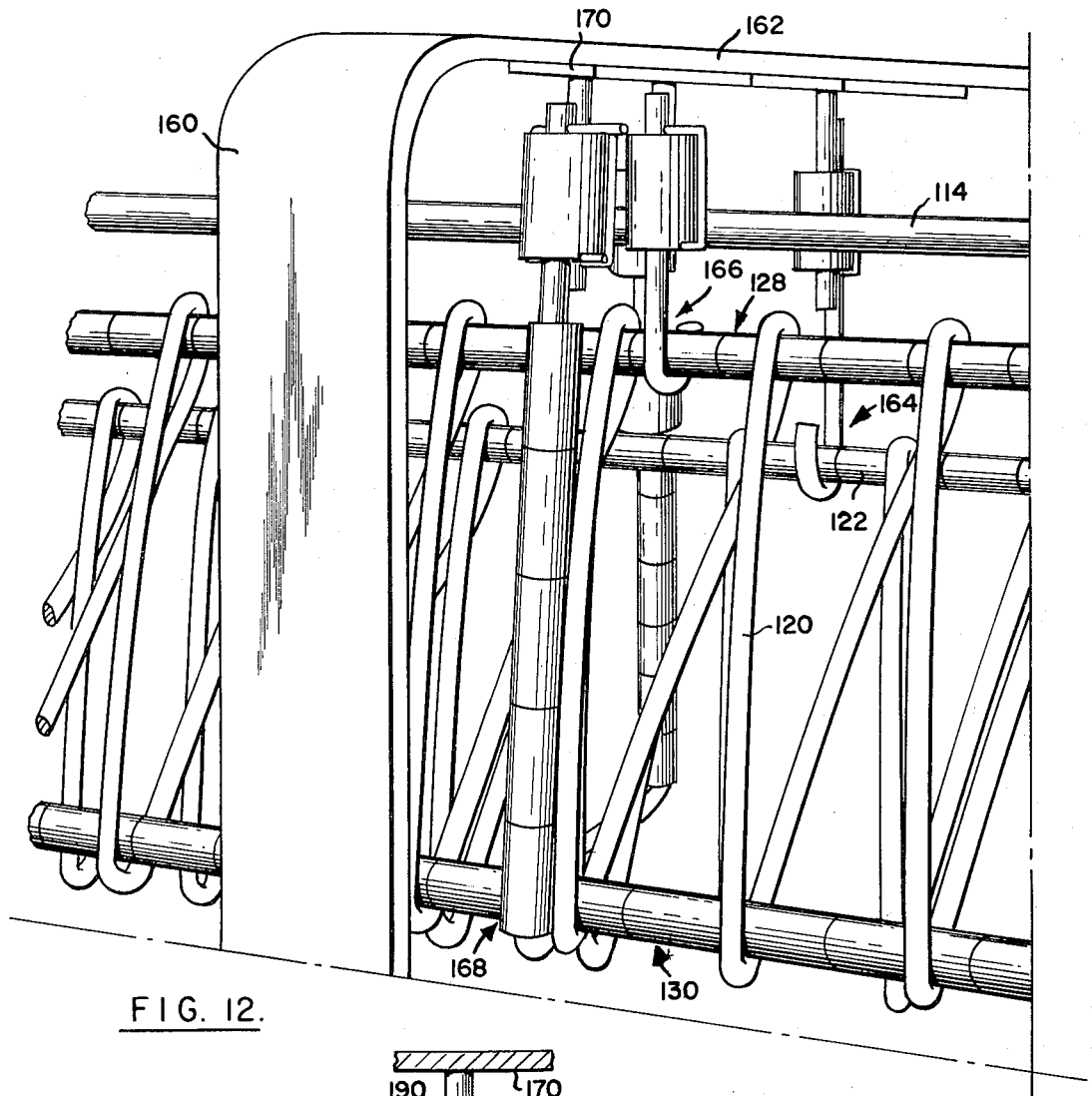
FIG. 12.
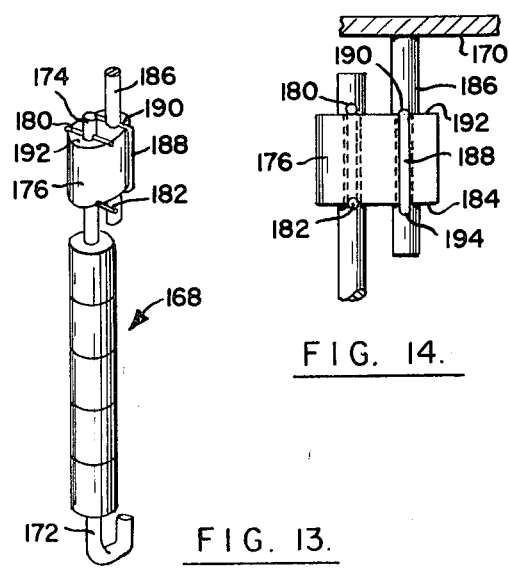
FIG. 13.
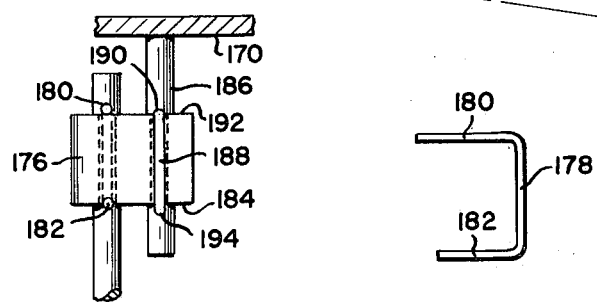
FIG. 14.
FIG. 15.
INVENTOR
GUSTAVE EHRENBERG
BY
Busser, Smith & Harding
ATTORNEYS

INVENTOR
GUSTAVE EHRENBERG

BY
Busser, Smith & Harding

ATTORNEYS

APPARATUS FOR COOKING FOODS

BACKGROUND OF THE INVENTION

This invention relates to apparatus for cooking foods. It has particular utility in the meat packing industry for cooking food items such as steaks, hamburgers, chickens and the like, prior to freezing. The apparatus may also be used in large restaurants where large volumes of similar food items are cooked prior to serving to the public.

Various apparatuses for cooking large quantities of food are known in the prior art. Conveyors consisting of metal links have been used to transport meat slowly past heat-providing means in order to cook the meat by broiling, but the conveyor surfaces in machines used in the past were horizontal. In one type of machine, heating elements were provided both above and underneath the conveyor. During cooking, grease dripped onto the lower heating element causing the production of large amounts of smoke and requiring frequent and laborious cleaning of the lower heating element, and of other parts of the machine on which smoke particles are deposited. The smoke, which consists of burnt grease, is also deposited on the food being cooked, causing a disagreeable taste. Furthermore, according to some authorities, burnt grease possesses carcinogenic properties, so that its elimination from the diet is desirable from a medical point of view.

One solution has been to eliminate the lower heating element, and to provide a mechanism for flipping the food item over at an intermediate point in its travel underneath the overhead heating element. Mechanisms which accomplish flipping reliably are necessarily very complex.

My U.S. Pat. No. 2,917,990, issued Dec. 22, 1959, discloses a hamburger cooking apparatus which has a comparatively low capacity. In it, hamburgers are carried by individual hangers. The hangers and heating elements are so arranged that a free space is provided for drippage to occur while the meat is being cooked. Heretofore, conveyor belts in cooking machines have all been substantially horizontal in the heating area. So far as I am aware, no successful attempt has been made to avoid the dripping of grease onto heating elements in a machine having a continuous conveyor travelling between a pair of heating elements.

Where electrical heating elements are used, various problems regarding safety arise, since there exists not only the danger of fire, but also the danger of short-circuiting high voltage to the machine framework.

Difficulties have also be encountered in the mounting of elongated heating elements of the type used in cooking machines since, at the temperatures involved, a great deal of expansion of the supports occurs. Differential expansion between different materials, e.g., insulators and support rods, can cause short-circuits to occur.

Another problem results from the high cost of electrical power. These machines typically consume between 25 and 100 kilowatts of power. This requires careful precautions in the design of the machine, to take advantage of both radiation and convection and to prevent heat loss.

Finally, there exists the problem of cleaning the conveyor continuously.

SUMMARY OF THE INVENTION

In accordance with this invention, there is provided a continuous conveyor made up of individual links, each of which comprises a substantially straight, elongated element, having, at both of its ends, a loop which is wrapped around the elongated element on the next link of the chain. Each of these loops defines a space substantially larger than the cross-section of the elongated element about which it is wrapped. This allows a twisting of the conveyor chain from a horizontal condition to an inclined condition. The loops are also self-cleaning by virtue of the rubbing of the elongated elements against the loops as the conveyor twists.

Means are provided for twisting the conveyor into an inclined condition as it approaches the space between a pair of heating elements and for maintaining the conveyor in the inclined condition until it moves out of the space between the heating elements.

In order to provide a safe support for the heating elements which is substantially immune to the adverse effects of differential expansion, metal rods are slidably supported by brackets, and are passed through a large number of individual, tubular, ceramic insulators, which are held against one another by springs. Electrical heating elements are supported by the insulators. The supporting rods can expand relative to the insulators.

The heating elements are wrapped around the insulators in a flattened helix so that as much of their length as possible is exposed in close proximity to the food passing between the heating elements on the conveyor. A well-insulated cover is provided, having an intake opening through which the conveyor passes into the space between the heating elements. A fan blows air through the intake opening in order to mix the air inside the cover to prevent stratification. After the food is cooked, it is discharged downwardly rather than through an opening in the end of the cover in order to avoid heat loss.

The conveyor is cleaned, as it passes from the food discharge point to the intake opening, by a pair of submerged, cylindrical, stainless steel, motor-driven brushes.

The principal object of the invention is to provide an automatic cooking apparatus of the conveyor belt type in which grease from the food being cooked is prevented from dripping onto heating elements and other hot surfaces while radiant and/or convection heat is applied to both sides of the food simultaneously.

Another object is to provide a cooking apparatus in which electrical heating elements are used with high efficiency.

Another object of the invention is to provide a cooking apparatus which is safe to operate.

Still another object is to provide a cooking apparatus utilizing a conveyor in which the conveyor is continuously cleaned.

Other objects will be apparent from the following description, when read in conjunction with the accompanying drawings.

BRIEF DESCRIPTION OF THE DRAWINGS

FIG. 3 is a vertical section of the intake end of the cooking apparatus;

FIG. 4 is a perspective of the intake opening of the cover of the cooking apparatus showing sprockets for effecting twisting of the conveyor;

FIG. 12 is a perspective view of a pair of heating elements showing the manner in which they are supported;

FIG. 13 is a perspective of a heating element supporting hook;

FIG. 14 is an elevation of an insulator;

FIG. 15 is an elevation of a clip used to attach metal rods to the insulator of FIG. 14;

DESCRIPTION OF THE PREFERRED EMBODIMENT

Figure 1:
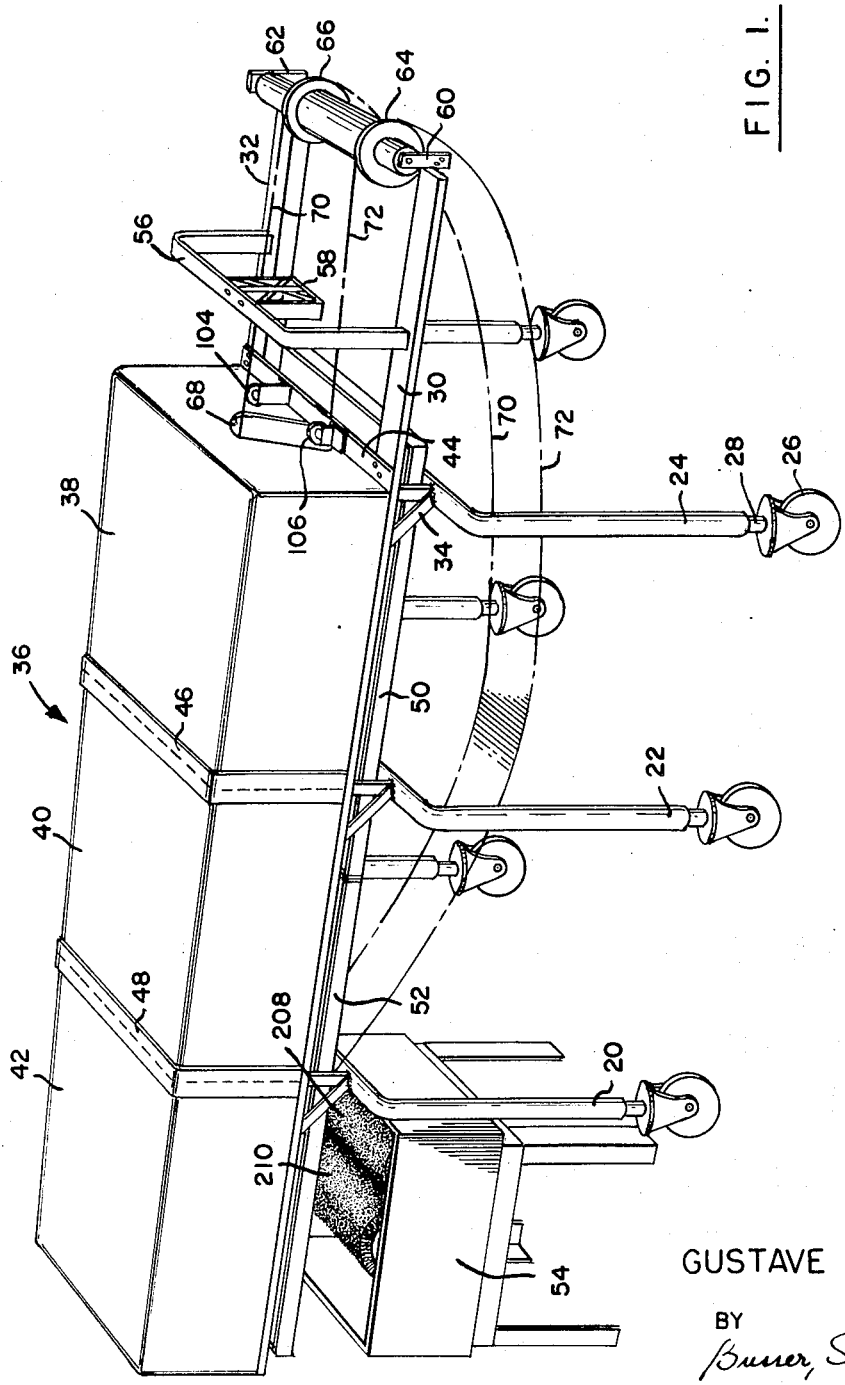
FIG. 1 is a perspective view of a cooking apparatus in accordance with the invention showing in diagrammatic form the path of the conveyor.

FIG. 1 shows three inverted U-shaped supports 20, 22 and 24, each of the supports comprising a pair of vertical members connected at their upper ends by horizontal members. At the lower ends of the vertical members, there are provided casters, all of which are identical to caster 26, which is provided at the lower end of the near vertical member of support 24. Caster 26 is connected to the vertical member by a retractable member 28. Similar retractable members are provided on each of the other legs, and these are adjustable for levelling of the apparatus.

Each of horizontal frame members 30 and 32 has an L-shaped cross section. These frame members are mounted on the supports by brackets, one of which is shown in FIG. 3 at 34.

A cover 36, which has an open bottom, comprises three sections: 38, 40 and 42.

Section 38 is provided with a flange 44 by which it is bolted to frame members 30 and 32. Flange 44 provides the only fastening to cover 36 and the frame members 30 and 32. Straps 46 and 48 connect the cover sections to each other and close off the space between the cover sections. Since the end of section 38 to which flange 44 is attached is the only part of the cover which is in fixed relationship to the frame, the other parts of the cover can freely expand and contract in a lengthwise direction. At the temperatures involved (Ambient temperature under the cover is typically between 800° and 1,000° F.), a cover 8 feet in length can expand as much as an inch, depending on the materials from which it is made.

Pans 50 and 52 are provided underneath the frame members, and are supported by the horizontal parts of supports 20, 22 and 24. These will be described later with reference to FIGS. 10 and 17. A container 54, underneath the discharge end of the machine, holds a cleaning bath for the conveyor. The cleaning mechanism will be described later with reference to FIGS. 10 and 11.

Member 56 supports an electrically-operated fan 58, which directs air toward the opening 68 at the end of the cover. The purpose of the fan is to prevent stratification underneath the cover by producing a small amount of air circulation to cause the air underneath the cover to be heated uniformly.

Brackets 60 and 62, provided at the ends of frame members 30 and 32 respectively, mount idler wheels 64 and 66, which the conveyor rides in its approach to opening 68.

Opening 68 is elongated, and its long sides are parallel and disposed at an inclined relationship with respect to the horizontal, preferably at a angle of about 60°, with respect to the horizontal. It will be recognized that a plurality of openings might be provided at the end of a single cover in a machine having multiple conveyors.

Broken lines 70 and 72 describe the path of the conveyor, which is in the form of a continuous, flexible chain made up from a plurality of identical links. This chain provides a main supporting surface for the food items carried by it, and also provides a secondary supporting surface which prevents the food items from sliding off the main supporting surface as the chain is brought into inclined relationship with the horizontal. The construction of the conveyor will be best understood from FIGS. 2, 4, 5, 6, 7, 8 and 9.

Figure 2:
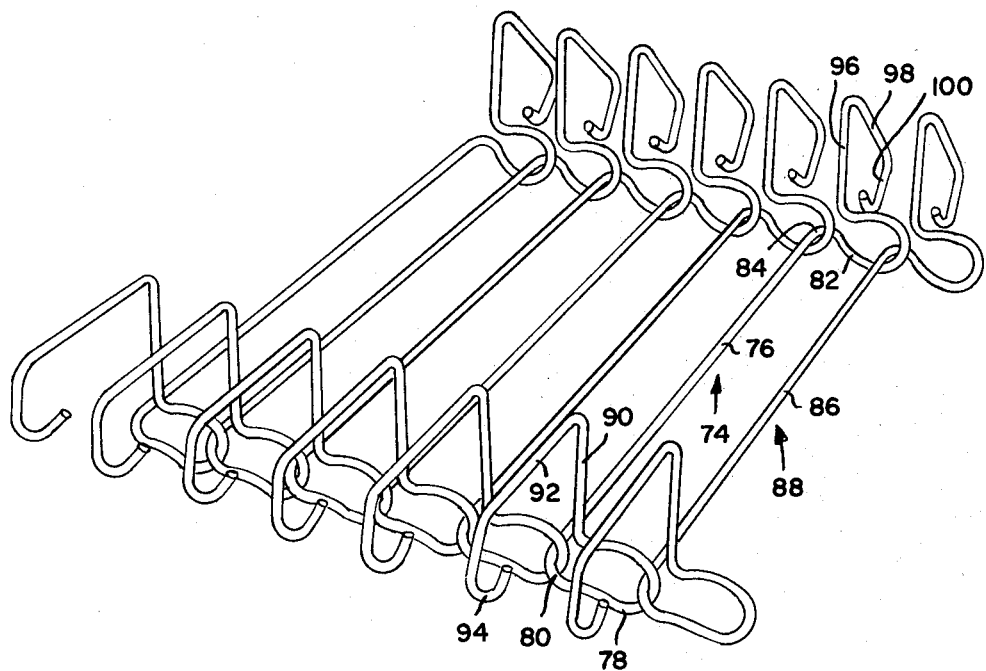
FIG. 2 is a perspective of a part of the conveyor.

FIG. 2 shows seven links of the chain. A first link 74 comprises an elongated, substantially straight element 76. Element 76, along with the corresponding elements in the other links, provides a perforate main supporting surface. Food is supported on the upper side of the chain, as it is shown in FIG. 2. At one end of element 76, there is formed a loop 78, which is not completely closed, although there is no reason why it could not be closed. Loop 78 lies substantially in a plane to which element 76 is perpendicular. The link is curved at 80 so that the plane in which loop 78 lies cuts through the substantially straight part 76 of the link; i.e., the loop is located inwardly with respect to the outermost extent of the link. This prevents the links from becoming separated from each other or tangled when not under tension, and also permits all links to be identical.

The minimum radius of the curvature of loop 78 is large compared to the radius of curvature of the cross-section of element 76. Thus, loop 78 defines an area which is substantially larger than the cross-sectional area of the straight element 76. A similar loop is provided at 82. It also lies in a plane cutting the straight part 76 of the link perpendicularly, a curvature being provided at 84 so that loop 82 lies in a plane which cuts through the straight part of element 76. A substantially straight element 86, which is part of link 88 corresponding to element 76 of link 74, extends through both loops 78 and 82 and is held thereby.

Loop 78 continues into a straight element 90, which is perpendicular to element 76. Element 90 provides part of the secondary supporting surface which prevents food items from sliding off the main supporting surface when the chain is tilted. Element 90 continues into a straight element 92, which is parallel to element 76. The purpose of element 92 is to rest on a guide as the chain passes between the heating elements in an inclined condition. A hook 94 may be provided at the end of element 92, but it is not absolutely necessary.

At the opposite end of element 76, loop 82 continues into a straight element 96, which is desirably provided in order to prevent food from sliding in the direction toward element 96 while the chain in horizontal. Element 96 is connected, through element 98, to a hook 100 by which the link 74 is hung from an upper guide rod. Element 98 is desirably disposed at an acute angle with respect to element 96, and hook 100 positioned so that a straight continuation of element 76 would intersect the center of the guide rod. The reason for this is to prevent friction between hook 100 and the guide rod from producing a twisting force on link 74 which would cause the hook to bind to the guide rod.

All of the links of the chain are identical, and they are preferably made entirely from stainless steel. The completed chain is closed upon itself to provide a closed surface, and is driven in a closed-loop path as indicated in FIG. 1.

Because the area defined by the loops is substantially larger than the cross-section of the elements passing through them, the chain twists relatively easily, and can twist from a horizontal condition at wheels 64 and 66 to a 60° relationship with respect to the horizontal at opening 68 in the relatively short distance between the wheels and the opening.

As twisting takes place, the relative motion between the loops and the elements passing through them tends to clean out particles of food and grease.

Figure 5:
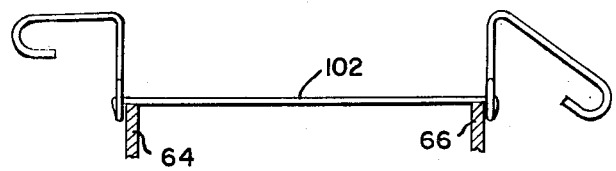
FIG. 5 is an elevation of a single link of the conveyor in horizontal condition, showing its relationship to a pair of guiding wheels.
Figure 6:
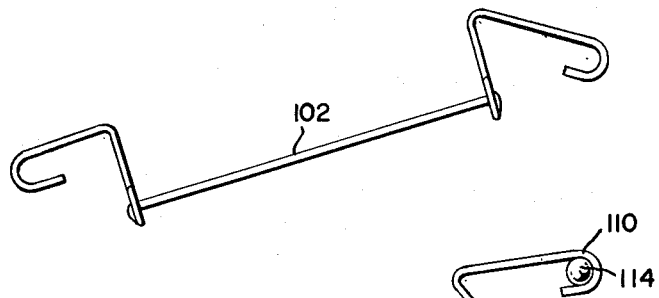
FIG. 6 is an elevation showing the link in the partially inclined condition which it would be in if located between the guide wheels in FIG. 5 and the intake opening of the cover.
Figure 7:
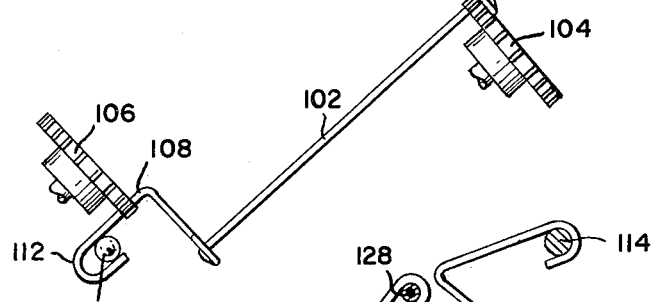
FIG. 7 is an elevation of a link of the conveyor in fully inclined condition showing the relationship between the link, the sprockets at the intake opening of the cover and the guide rods.
Figure 8:
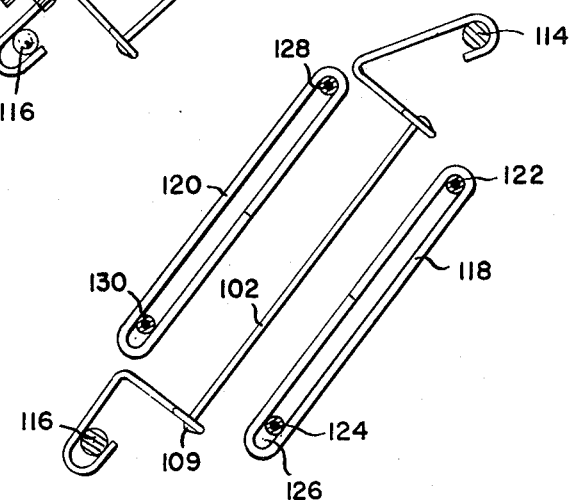
FIG. 8 is a vertical section taken on a surface cutting transversely through the heating elements and the guide rods, showing the relationship between the conveyor and the heating elements.
Figure 9:
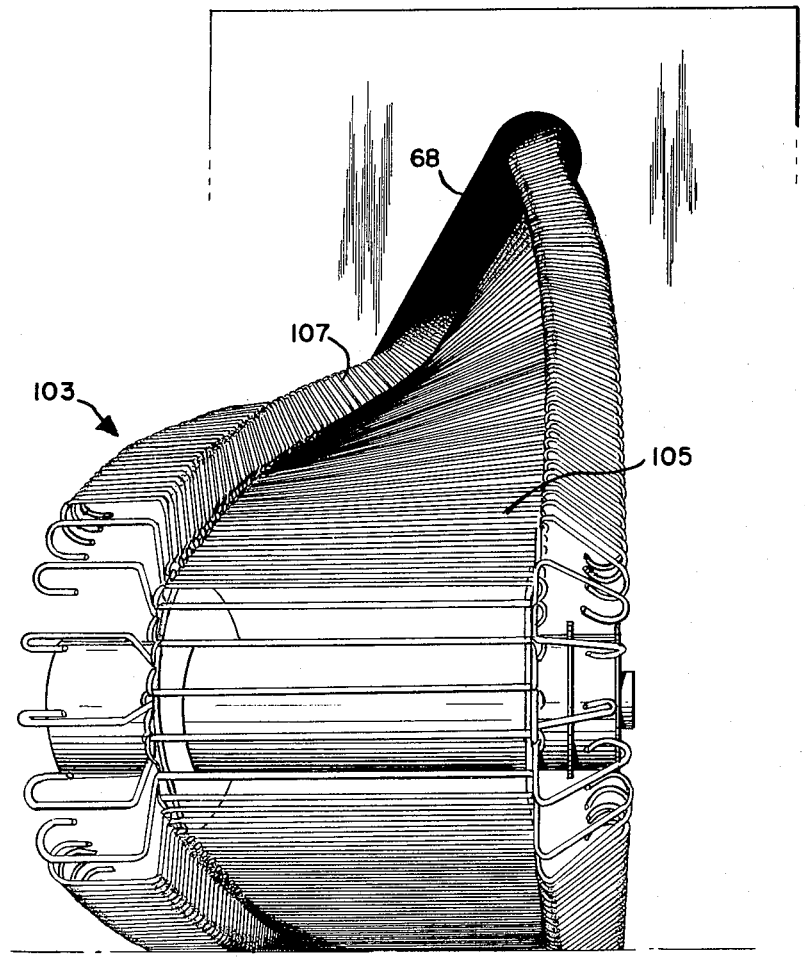
FIG. 9 is an elevation of the intake end of the apparatus.

FIGS. 5 through 9 show a link 102 in sequential stages of twisting as it passes from wheels 64 and 66 into the space between the heating elements. FIG. 5 shows link 102 in a horizontal condition as it passes over wheels 64 and 66. The main surface should be substantially horizontal through part of its travel between idler wheels 60 and 64 and opening 68 in order to facilitate reception of food items from a supply conveyor. The link gradually twists, from a substantially horizontal condition, through the condition shown in FIG. 6, to the fully inclined condition illustrated in FIG. 7. The twisting part of the assembled conveyor chain 103 is shown in FIG. 9. It will be apparent that items of food can be dropped onto the main surface 105 of the chain while it is substantially horizontal, and that they are moved into an inclined condition before they pass through opening 68. The food is prevented from sliding off the main surface by the secondary surface provided at 107 by the parts of the links which are disposed perpendicularly to the elongated elements of the main surface. As grease is produced, it will travel downwardly along the meat and along the elongated part of link 102 because of its surface tension. When a sufficient quantity of grease collects at end 109 (FIG. 8) of the elongated part of the link, it will drop downwardly between the lower edges of the heating coils 118 and 120 to be collected in the water pans.

Upper idler sprocket 104, shown in FIGS. 4 and 7, engages the elongated parts of the links near their upper ends, and from the underside of the chain. Idler sprocket 106 engages the section 108 of link 102 from its upper side. The function of sprockets 104 and 106, which rotate about inclined axes, is to guide the chain into a twisted condition such that its hooks 110 and 112 are moved over the ends of guide rods 114 and 116 respectively. As link 102 moves through opening 68 (FIG. 4) in the end of the cover, it is guided by rods 114 and 116, as shown in FIG. 8, so that its elongated element is positioned to hold a piece of meat or other food approximately midway between heating coils 118 and 120. Heating coil 118 is mounted on supports 122 and 124, a space being allowed at 126 for contraction on cooling. Coil 120 is similarly mounted on supports 128 and 130. The heating coils are flattened, and helically wound at a relatively low pitch so that the sides which are farthest away from the food being cooked have maximum exposure to the food. Supports 122, 124, 128 and 130 are positioned so that the heating coils are disposed at the same inclination as the elongated elements of the links passing between them. The heating coils may be made from an alloy of nickel and chromium or from other suitable electrically resistive materials.

In large cooking machines, it is desirable to use relatively high voltages, e.g. 240 v.a.c., to supply the heating coils because of the high wattage involved. Care must be taken to avoid short-circuiting of the heating coil to the machine frame since the voltage will be high along most of the length of the heating coils. Particular care must be exercised because the heat produced causes expansion of elements which produce short-circuits. The heating coil support structure prevents short-circuits from occurring.

Figure 16:
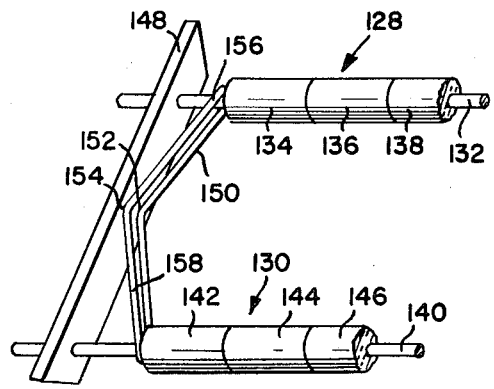
FIG. 16 is a perspective of a spring for holding the ceramic insulating elements of the heating element support together.

As seen in FIG. 16, which shows heating element supports 128 and 130, each of the supports consists of a plurality of short, tubular, ceramic insulating elements mounted end-to-end on a steel rod. The ceramic elements are not necessarily in the form of closed cylinders, but they should be constructed in such a way that they cannot be removed from the steel rods except at its ends. Support 128 comprises a steel rod 132 on which there are mounted a large number of ceramic, tubular elements including elements 134, 136 and 138. Support 130 similarly comprises a steel rod 140 on which there are mounted ceramic elements including elements 142, 144 and 146. The steel rods 132 and 140 are slidably supported, at both ends, in holes in metal supporting brackets. A supporting bracket at one end is shown in FIG. 16 and 148, the other bracket being identical.

A steel spring element 150 is slipped over rods 132 and 140. From the points 152 and 154 at which the spring element rests against the bracket, a first loop 156 extends around rod 132 and exerts a force against the end of ceramic element 134. A second loop 158 extends around rod 140 and exerts a similar force against ceramic element 142. A front bracket (not shown) supports the opposite ends of rods 132 and 140. Thus, the ceramic elements are held together by the spring element 150, forcing the ceramic elements against the front bracket holding rods 132 and 140.

The steel rods 132 and 140 will expand as a result of heating by the heating element, and are allowed to do so freely because of the manner in which they are supported by bracket 148. The ceramic elements may also expand to a different extent than the rods. A large number of short, ceramic elements are used rather than a single long ceramic element, since to long ceramic element would be liable tot crack because of metal bending as heat is applied. The individual short ceramic elements are reliably held against each other by the resilient pressure imparted by the spring elements so that the current-carrying heating elements cannot become grounded to the steel rods which pass through the ceramic insulators.

Since the heating element supports 128, 130, 122 and 124 are quite long, being typically 5 feet or more in length, they cannot be supported merely at their ends by brackets such as bracket 148. Intermediate supports must be provided as well. The intermediate supports are capable of contacting the heating coils, and additional precautions must therefore be taken to avoid short-circuiting the heating coils to the frame of the machine through the intermediate supports. FIGS. 12, 13, 14 and 15 illustrate the manner in which intermediate support of the heating elements is accomplished. An inverted U-shaped bracket 160, shown in FIG. 12, is mounted between the main frame element. From its horizontal part 162, hooks 164, 166 and 168 depend. These hooks respectively hold intermediate parts of heating element supports 122, 128 and 130. These hooks are similar to each other, differing only in their lengths. They are mounted, at their upper ends, on plates such as plate 170, which are bolted to part 162 of bracket 160 and capable of being moved horizontally for adjustment. Hook 168 is shown more clearly in FIG. 13. It comprises a J-shaped steel member 172, the upper end 174 of which extends vertically through a hole in ceramic insulator 176. A C-shaped pin 178 (FIG. 15) has an upper horizontal part 180 which extends through a transverse hole near the upper end of element 172, as shown in FIGS. 13 and 14. Horizontal part 182 of pin 178 similarly passes through a transverse hole in member 172. Pin 178 restrains member 172 against vertical motion with respect to the insulator. As shown in FIG. 14, horizontal part 182 of the pin fits in a groove in the lower face 184 of insulator 176 to restrain member 172 against rotation with respect to insulator 176. The groove is provided in the lower face of insulator 176 rather than in the upper face, since no force is applied to the lower face of the insulator as a result of the weight of the heating elements and the supports. If force were applied in a groove in the face of an insulator, this would tend to split the insulator.

A vertical steel rod 186 extends downwardly from plate 170 and through a vertical hole in insulator 176 which is parallel to the hole through which member 172 extends. A c-shaped pin 188, which is identical to pin 178, retains insulator 176 on rod 186. The insulator is prevented from rotating with respect to the rod 186 because of the fact that the upper horizontal part 190 of rod 186 rests in a groove on the upper face 192 of the insulator. In this case, force is applied to the lower face of the insulator by the horizontal part 194 of pin 188 which is not in a groove in the insulator.

Figure 10:
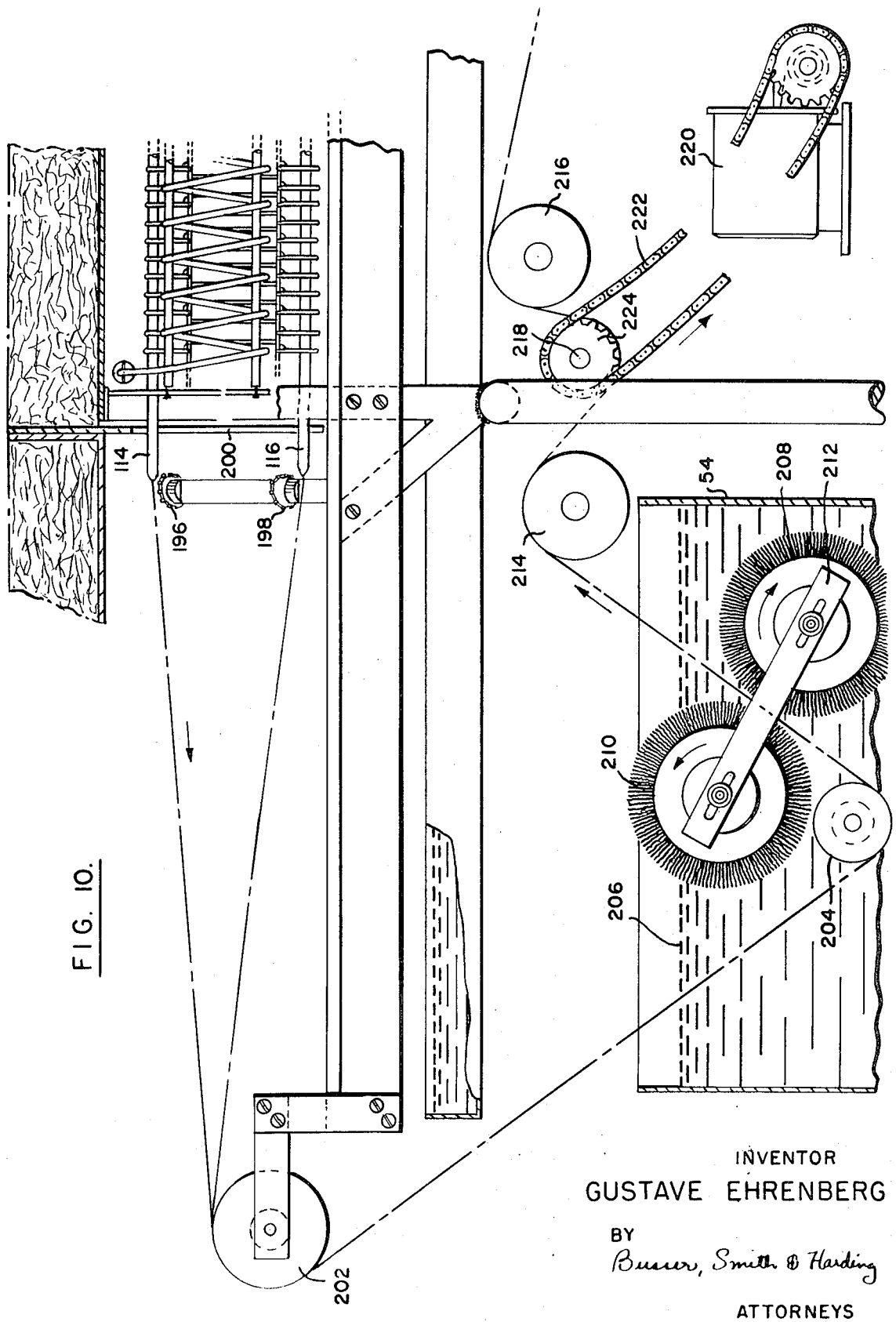
FIG. 10 is a vertical section of the discharge end of the apparatus.

Guide rods 114 and 116 (shown in FIGS. 7 and 8) are also shown in FIGS. 3 and 10. These guide rods are parallel to each other, but are both horizontally and vertically displaced from each other in order to hold the conveyor in inclined relation with respect to the vertical as it passes between the heating elements. The guide rods should be substantially straight in order to avoid friction between the guide rods and the parts of the conveyor links which come into contact with them. Although the guide rods can be extended lengthwise and curved so that they guide the chain from a horizontal condition into an inclined condition, the use of idler sprockets to effect twisting is preferred since their use results in less frictional drag on the conveyor. Idler sprockets 104 and 106 are shown in FIGS. 3 and 4.

Figure 18:
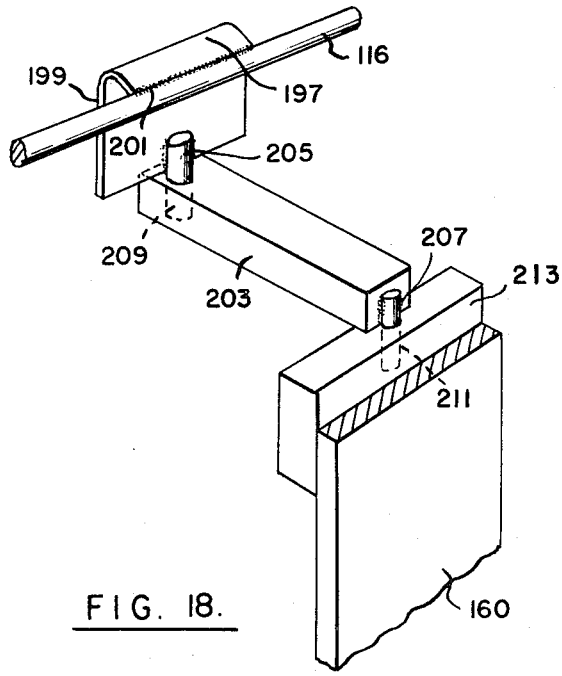
FIG. 18 is a perspective of a support for the lower guide rod, which aids the upper guide rod in maintaining the conveyor in inclined relationship to the vertical as it passes through the space between the heating elements.

FIG. 18 shows the manner in which guide rod 116 is mounted. The tip 197 of a curved metal element 199 is welded at 201 to guide rod 116. Element 199 is attached through bracket 203 to frame element 213, which is fixed to the inside of the vertical part of bracket 160 (FIG. 12). Pins 205 and 207, which are rotatable in holes 209 and 211 respectively, allow element 199 to move with respect to frame element 213 when guide rod 116 expands in a lengthwise direction. A number of similar mountings (not shown) are provided for the support of rod 116 along its length. One of these mountings near the middle of the length of the machine fixes a point of guide rod 116 to the frame. The remaining mountings allow for expansion of the guide rod. The upper guide rod 114 is similarly mounted.

Idler sprockets 196 and 198 are provided at the exit opening 200, as shown in FIG. 10. Between idler sprockets 196 and 198 and a pair of discs including disc 202, the conveyor twists from an inclined condition to a horizontal condition as shown diagrammatically in FIG. 10. The food items are discharged as the conveyor passes over the pair of discs.

The conveyor passes underneath an idler 204 which is located in container 54 underneath the level of the cleaning liquid 206. From idler 204, the chain passes upwardly between a pair of cylindrical brushes 208 and 210. These cylindrical brushes have stainless steel bristles. They are mounted on support 212 in such a relation to each other that the bristles on both of them are capable of contacting the elongated parts of the links of the conveyor. The conveyor then passes over idler 214, and over idler 216, from which it passes to idler wheels 64 and 66 (FIG. 1). Between idlers 214 and 216, the conveyor passes underneath driving sprockets 215 and 217 (FIG. 11) on a shaft 218. These driving sprockets are driven by motor 220 through a chain 222 which drives sprocket 224, also on shaft 218.

Figure 11:
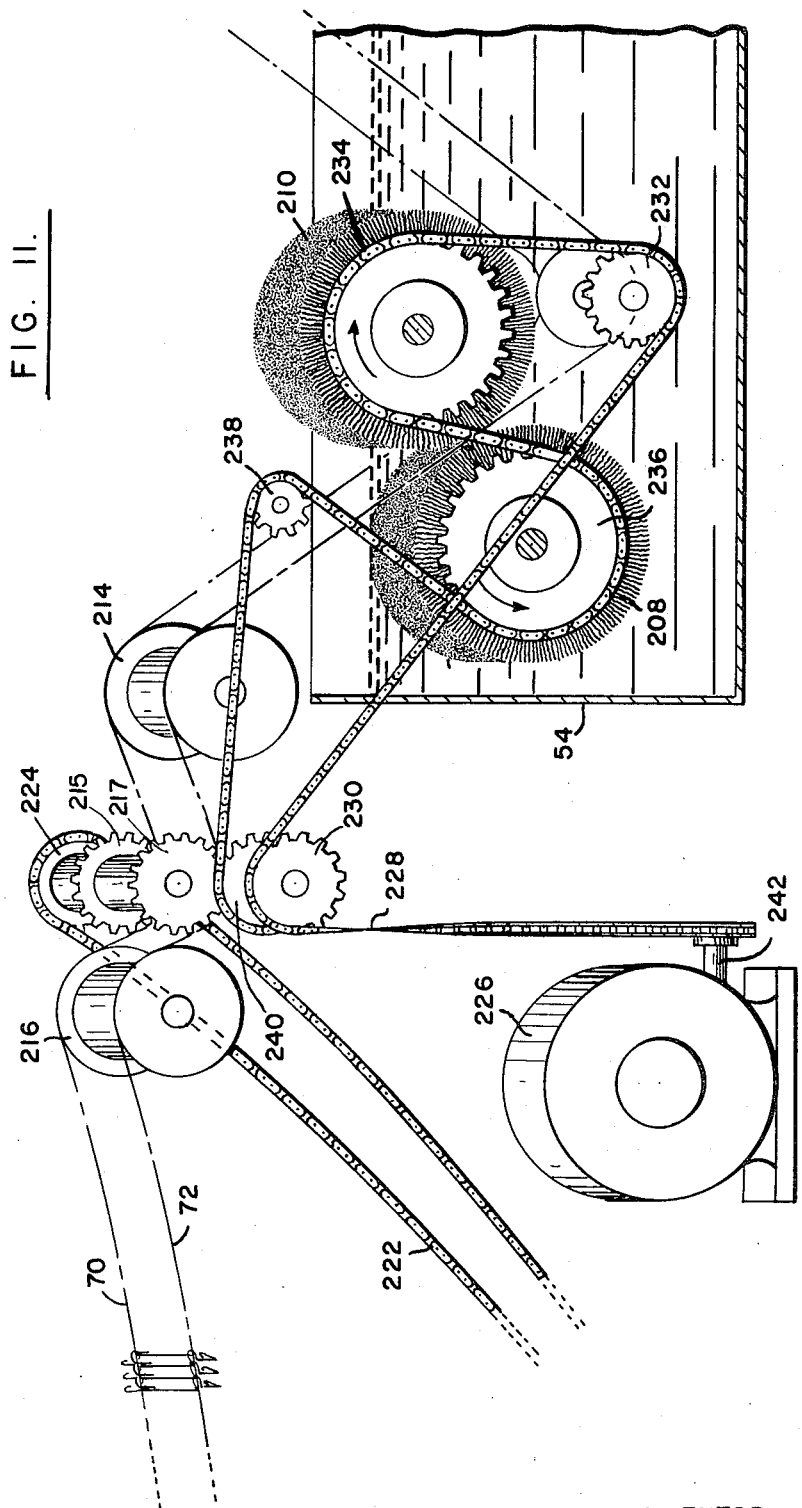
FIG. 11 is an elevation of the conveyor cleaning mechanism showing the motor drive for the cleaning mechanism.

The cylindrical brushes 208 and 210 are power-driven as shown in FIG. 11. A motor 226 drives a chain 228 which passes idler sprocket 230, underneath sprocket 232, over sprocket 234 which is fixed to a shaft driving cylindrical brush 210, underneath sprocket 236 which is fixed to a shaft driving cylindrical brush 208, over idler 238, and over idler 240 to the sprocket on motor shaft 242. The cylindrical brushes rotate in the direction indicated by arrows so that the action of the brushes against the surfaces of the conveyor does not impart a retarding force to the movement of the conveyor. With the cylindrical cleaning brushes in operation, the cooking apparatus can be operated continuously for a long period of time.

Figure 17:
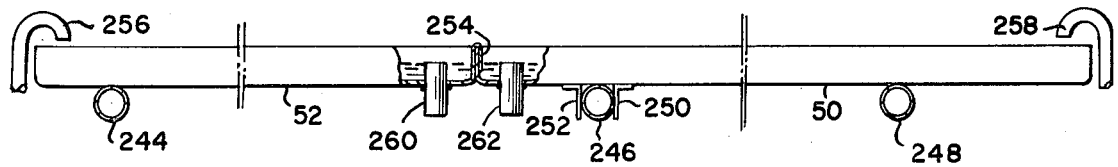
FIG. 17 is a partially cut-away elevation of a pair of interlocking, water-containing pans for collecting grease.

Underneath the heating elements, drippings of grease from the food being cooked are collected in water pans and carried off continuously. A pair of water pans 50 and 52 are shown in FIG. 17. These pans rest on horizontal members 244, 246 and 248 connecting the legs. These pans become hot because of their proximity to the heating elements, and differential expansion between pans and supports occurs. In order to allow for lengthwise differential expansion, only one point of constraint is provided against horizontal lengthwise movement. A pair of brackets 250 and 252 fastened to the underside of pan 50 define a channel which fits over support member 246. Pan 50 merely rests on support member 248, and pan 52 merely rests on member 244. At the right-hand end of pan 52, there is formed a hook 254 which fits over the edge of pan 50 to connect the pans together.

The pans are continuously fed with water through pipes 256 and 258. The pans are drained through standpipes 260 and 262 respectively. The standpipes are provided in order to maintain a constant water level in the pans. The action of these standpipes skims off the grease from the water. Standpipes 260 and 262 can be connected to suitable traps.

The delivery of electric current to the heating coils is manually or thermostatically controlled through conventional solid-state circuitry providing adjustable heating by providing a variable duty cycle.

The disclosed apparatus is capable of cooking large quantities of food while eliminating excess grease and preventing the production of smoke by the dripping of grease onto hot surfaces. It is self-cleaning and can be operated continuously for long periods of time without stopping for cleaning or other services. Expansion of elements because of their proximity to the heat producing elements is accommodated by special construction.

Numerous modifications can be made to the apparatus. For example, several conveyors can be run in parallel through a single enclosure.

What is claimed is:

1. Apparatus for cooking foods comprising
means providing a flexible, closed, perforate surface having a relatively narrow width compared to its length,
means for driving said surface-providing means in an elongated closed-loop path,
guide means maintaining at least a part of said surface in inclined relationship to the vertical,
heat-radiating means on both sides of an inclined part of said surface-providing means,
said heat-radiating means comprising two pairs of supporting rods, each pair being on one side of the surface-providing means, insulating means surrounding each rod, and a pair of electrically conductive heating elements, one on each side of said surface-providing means, each heating element being wound around both of the insulating means on one side of the surface-providing means to form a coil having spaced turns.

2. Apparatus for cooking foods comprising
means providing a flexible, closed, perforate surface having a relatively narrow width compared to its length,
means for driving said surface-providing means in an elongated closed-loop path,
guide means maintaining at least a part of said surface in inclined relationship to the vertical,
heat-radiating means on both sides of an inclined part of said surface-providing means,
said heat-radiating means comprising at least one electrically conductive heating coil and supporting means for said coil, said supporting means comprising a plurality of short, tubular ceramic insulating elements, a supporting rod extending through said ceramic elements, means mounting said rod against movement transverse to its length but allowing lengthwise expansion and contraction of said rods, and means maintaining a resilient pressure against said ceramic element at at least one end of the plurality of ceramic elements to prevent separation of said ceramic elements, one from another.

3. Apparatus for cooking foods comprising
means providing a flexible, closed, perforate surface having a relatively narrow width compared to its length,
means for driving said surface-providing means in an elongated closed-loop path,
guide means maintaining at least a part of said surface in inclined relationship to the vertical,
heat-radiating means on both sides of an inclined part of said surface-providing means,
said heat-radiating means comprising at least one electrically conductive heating coil, at least one insulated rod supporting said coil, at least one metal hook supporting said insulated rod, and means for connecting said hook to a supporting frame, said connecting means comprising an insulator for electrically isolating said hook from said frame.

4. Apparatus for cooking foods comprising
a continuous chain made up of a plurality of individual links, each of said links having an elongated part extending transversely to the length of the chain, the elongated parts of said links providing a perforate supporting surface for food,
means for driving said chain in an elongated closed-loop path,
guide means maintaining at least a part of said perforate surface in inclined relationship to the vertical,
heat-radiating means on both sides of an inclined part of said perforate surface,
the elongated part of each of said links having a hook attached to it at the end which is uppermost when the link is in inclined relationship with the vertical, and said guide means including a substantially straight guide rod, and means for guiding said hooks onto said guide rod.

5. Apparatus for cooking foods comprising
a continuous chain made up of a plurality of individual links, each of said links having an elongated part extending transversely to the length of the chain, the elongated parts of said links providing a perforate supporting surface for food,
means for driving said chain in an elongated closed-loop path,
guide means maintaining at least a part of said perforate surface in inclined relationship to the vertical, and
heat-radiating means on both sides of an inclined part of said perforate surface,
each of said links being provided, at its end which is lowermost when the link is in inclined relationship with the vertical, with means for preventing food from sliding off said chain.

6. Apparatus for cooking foods comprising
means providing a flexible, closed perforate surface having a relatively narrow width compared to its length,
means for driving said surface-providing means in a closed-loop path,
guide means maintaining said surface, throughout at least part of said path, in inclined relationship with a vertical plane in which there lies a line parallel to the direction of travel of said surface providing means in said part of said path,
means, directly fixed to and carried by said surface-providing means, for preventing food from sliding off said surface, and
heat radiating means on both sides of the inclined part of said surface-providing means.

7. Apparatus for cooking foods comprising
means providing a flexible, closed perforate surface having a relatively narrow width compared to its length,
means for driving said surface-providing means in a closed-loop path,
guide means maintaining said surface throughout at least part of said path, in inclined relationship with a vertical plane in which there lies a line parallel to the direction of travel of said surface providing means in said part of said path,
means, directly fixed to and carried by said surface-providing means, for preventing food from sliding off said surface, and
heat radiating means located on both sides of the inclined part of said surface-providing means and so arranged with respect to each other and to said surface as to provide a space underneath the lowermost edge of the inclined part of said surface for drippage of grease.

8. Apparatus according to claim 7 in which said surface includes means for conveying grease to the lowermost edge of the inclined part thereof.

9. Apparatus according to claim 7 including means providing an enclosure for impeding the escape of hot air from the vicinity of said inclined part of said surface.

10. Apparatus according to claim 7 including means located underneath the lowermost edge of the inclined part of said surface for containing water to catch grease which drips from said edge.

11. Apparatus according to claim 7 including a box covering said inclined part of said surface, said box having an opening in one of its ends through which said surface-providing means enters the interior of the box and being open at least in part at its bottom, and including means for blowing air inwardly through said opening into the space within said box.

12. Apparatus according to claim 7 in which said heat radiating means comprises at least two resistive electrical heating coils, one on each side of the inclined part of said surface.

13. Apparatus for cooking foods comprising
a continuous chain made up of a plurality of individual links, each of said links having an elongated part extending transversely to the length of the chain, the elongated parts providing a perforate supporting surface for food,
means for driving said chain in a closed-loop path,
guide means maintaining the elongated parts of said links, throughout at least part of said path, in inclined relationship with a vertical plane in which there lies a line parallel to the direction of travel of said chain in said part of said path,
means, provided along the edge of said chain which is lowermost when said chain is inclined, for preventing food from sliding off said chain,
heat radiating means on both sides of the inclined part of said chain.

14. Apparatus for cooking foods comprising
a continuous chain made up of a plurality of individual links, each of sad links having an elongated part extending transversely to the length of the chain, the elongated parts providing a perforate supporting surface for food,
means for driving said chain in a closed-loop path having upper and lower parts,
guide means maintaining the elongated parts of the links in a part of said surface along the upper part of said path, in inclined relationship with a vertical plane, and allowing the remainder of the elongated parts of the links in the upper part of said path to lie substantially horizontally,
heat radiating means on both sides of the inclined part of said surface along the upper part of said path
a container for cleaning liquid, and
means for guiding the chain downwardly into and upwardly out of said liquid in the lower part of said path whereby said chain becomes temporarily immersed in said liquid.

15. Apparatus for cooking foods comprising
a continuous, twistable conveyor chain comprising a plurality of individual links each of said links having an elongated part extending transversely to the length of the chain, the elongated parts of said links providing a perforate supporting surface for carrying food, each link having a pair of loops, one loop of said pair being connected to and located near one end of the elongated part of said link and the other loop of said pair being connected to and located near the other end of said elongated part, the loops in each of said pairs extending around an elongated part of a next adjacent link and at least one of the loops in said pair defining an area substantially larger than the cross-sectional area of the elongated part around which it extends, to allow twisting of said chain in a relatively short distance, means for driving said chain in an elongated closed-loop path having upper and lower parts, guide means maintaining the elongated parts of the links, in a part of said surface along the upper part of said path, in inclined relationship with a vertical plane, and allowing the remainder of the elongated parts of the links in the upper part of said path to lie substantially horizontally, and heat-radiating means on both sides of the inclined part of said perforate surface.

16. Apparatus according to claim 14 including brush means located in said container and in contact with said chain.

* * * * *